United States Patent [19]

Wilcox

[11] Patent Number: 4,657,098

[45] Date of Patent: Apr. 14, 1987

[54] HOBBY HORSE

[75] Inventor: Roy Wilcox, Davison, Mich.

[73] Assignee: Roy's Toys, Inc., Davison, Mich.

[21] Appl. No.: 781,676

[22] Filed: Sep. 30, 1985

[51] Int. Cl.⁴ ............................................. B62D 57/02
[52] U.S. Cl. .................................... 180/8.1; 280/1.183
[58] Field of Search .......................... 180/8.1, 8.3, 8.4; 280/1.181, 1.182, 1.183, 1.184

[56] References Cited

U.S. PATENT DOCUMENTS

| 498,847 | 6/1893 | Godbe | 280/1.182 |
|---|---|---|---|
| 1,337,479 | 4/1920 | Loomis | 280/1.181 |
| 1,369,628 | 2/1921 | Dahl | 280/1.181 |
| 1,819,029 | 8/1931 | King et al. | 280/1.183 |
| 2,015,974 | 10/1935 | Stannard | 272/53 |
| 2,325,496 | 7/1943 | Fleming | 272/52 |
| 2,712,937 | 7/1955 | Bell | 272/53.1 |
| 3,010,729 | 11/1961 | Tomosy | 280/1.181 |
| 3,999,771 | 12/1976 | Lehr | 280/1.13 |
| 4,561,514 | 12/1985 | Yamada | 280/1.181 X |

FOREIGN PATENT DOCUMENTS 10950 10/1902 Austria .............................. 280/1.181

Primary Examiner—John A. Pekar
Attorney, Agent, or Firm—Gifford, Groh, VanOphem, Sheridan, Sprinkle & Dolgorukov

[57] ABSTRACT

An electrically powered hobby horse having an elongated body and a front leg and a rear leg which support the body above the ground. The front and rear legs are pivotally mounted about a horizontal axis so that the legs pivot towards and away from each other. A ground engaging wheel is carried at the lower end of each leg and a one way clutch is associated with each wheel so that the wheels rotate only in one direction. An electrical motor is mechanically connected by arms to both legs to reciprocally pivot the legs about their axis and thereby propel the hobby horse.

6 Claims, 5 Drawing Figures

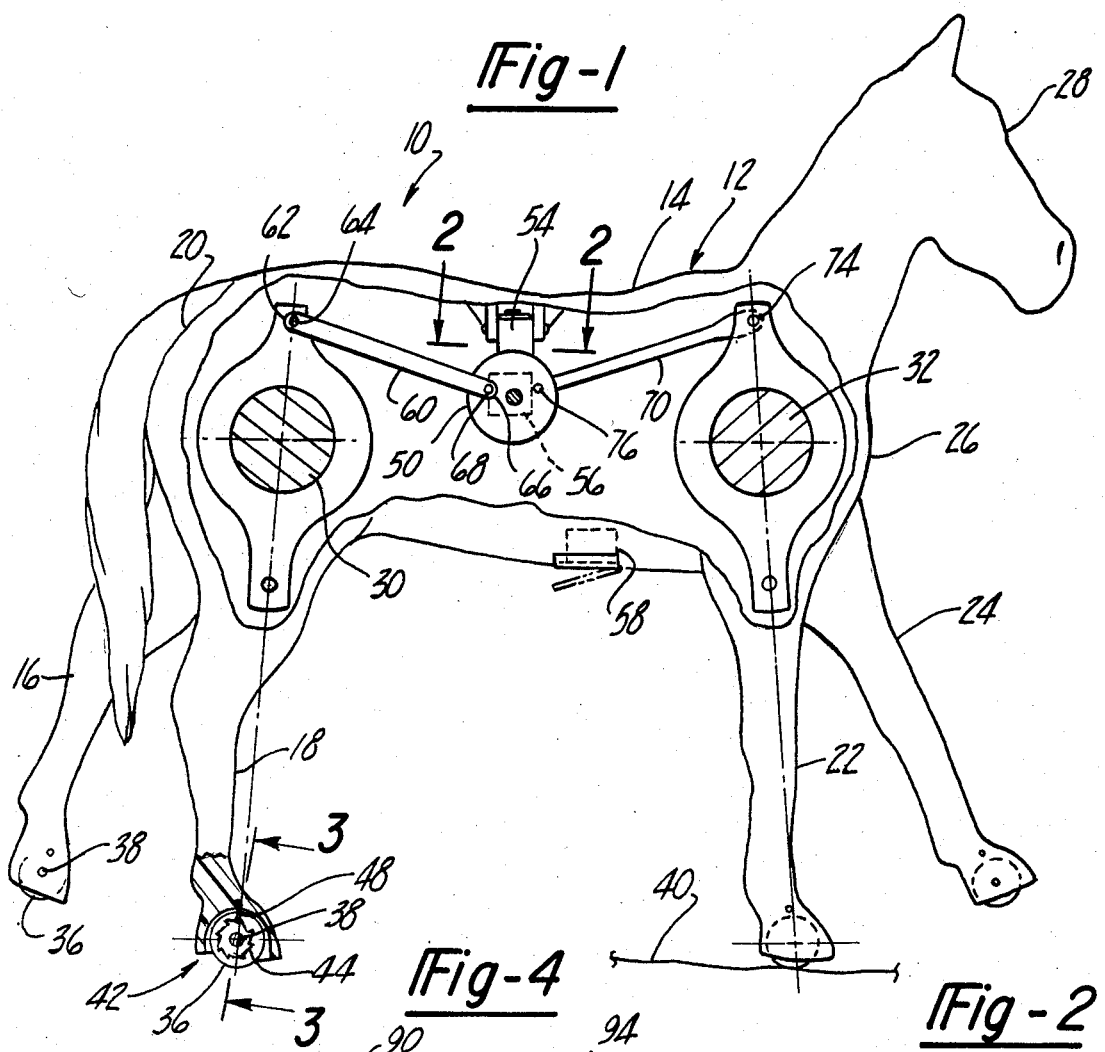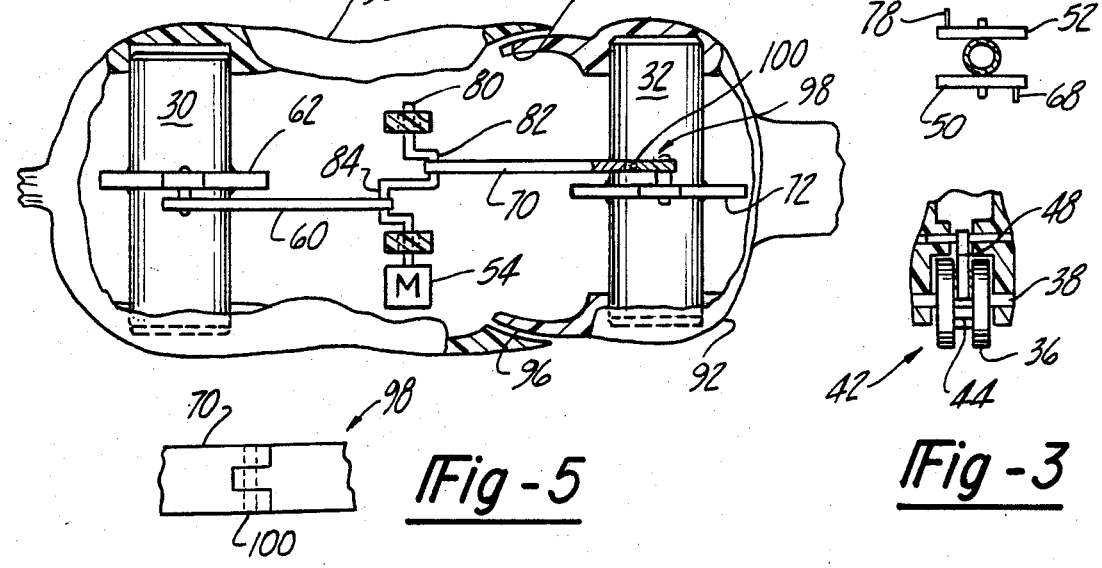

HOBBY HORSE

BACKGROUND OF THE INVENTION

I. Field of the Invention

The present invention relates generally to hobby horses and, more particularly, to a hobby horse which is propelled by an electric motor.

II. Description of the Prior Art

There are a number of previously known hobby horses for children. Such hobby horses usually resemble a real horse and thus have an elongated body which is supported above the ground by one or more front legs and one or more rear legs. Furthermore, although many of these previously known hobby horses are stationary, there have been a number of previously known hobby horses which can be propelled by the child along the ground support surface.

One disadvantage of this previously known hobby horses which can be propelled along the ground by the child is that such hobby horses are complicated and, therefore, expensive in construction. Furthermore, these previously known hobby horses have been propelled by the child's muscles so that the child becomes physically tired after a relatively short period of time.

SUMMARY OF THE PRESENT INVENTION

The present invention provides a hobby horse which overcomes all of the above mentioned disadvantages of the previously known hobby horses.

In brief, the hobby horse of the present invention comprises an elongated body having an upper surface adapted to support a rider. At least one front leg and at least one rear leg support the body above the ground.

The upper ends of both the front and rear leg are pivotally secured to the body about a horizontal axis which extends tranversely with respect to the longitudinal axis of the body. Furthermore, the pivotal axis of the front and rear legs are spaced apart and substantially parallel to each other so that, upon pivotal action of the legs, the legs pivot towards and away from each other.

A wheel is secured to and protrudes downwardly from the lower end of each leg so that the wheels engage a ground support surface and support the hobby horse. Furthermore, each wheel includes a one way clutch which allows the wheel to rotate in only one direction.

An electrically powered motor is contained within the body of the horse and is mechanically coupled by a pair of arms to the upper end of each leg. A crank shaft or cam wheel arrangement between the electric motor and the arms longitudinally reciprocally drives the arms about their longitudinal axis. In doing so, the arms reciprocally pivot the legs about their horizontal axis towards and away from each other thereby propelling the hobby horse in the forward direction.

BRIEF DESCRIPTION OF THE DRAWING

A better understanding of the present invention will be had upon reference to the following detailed description when read in conjunction with the accompanying drawing wherein like references characters refer to like parts throughout the several views, and in which:

FIG. 1 is a partial sectional side view of the preferred embodiment of the invention;

FIG. 2 is a cross sectional view taken along line 2—2 of FIG. 1;

FIG. 3 is a sectional view taken along line 3—3 in FIG. 2;

FIG. 4 is a partial sectional top view of the preferred embodiment of the invention; and FIG. 5 is a fragmentary view illustrating one component of the preferred embodiment.

DETAILED DESCRIPTION OF PREFERRED EMBODIMENTS OF THE PRESENT INVENTION

With reference first to FIG. 1, a preferred embodiment of the hobby horse 10 of the present invention is thereshown and comprises an elongated body 12 having an upper surface 14 adapted to support a child. At least one and preferably two rear legs 16 and 18 depend downwardly from the rear end 20 of the body 12. Similarly, at least one and preferably two front legs 22 and 24 depend downwardly from the front end 26 of the body 12. A horse's head 28 extends upwardly from the front end 26 of the body 12 so that the hobby horse 10 resembles a real horse.

With reference now to FIGS. 1 and 4, the upper ends of the rear legs 16 and 18 are attached to a shaft 30 which is pivotally mounted to the body 12 about a horizontal axis extending transversely with respect to the axis of the body 12. The shaft 30 thus enables the rear legs 16 and 18 to pivot toward and away from the front legs 22 and 24. In addition, the rear legs 16 and 18, although fixed to the shaft 30, are preferably angularly spaced between 20 and 30 degrees from each other as best shown in FIG. 1.

Similarly, the front legs 22 and 24 each have their upper ends secured to a shaft 32. This shaft 32 is pivotally mounted to the body 12 about a horizontal axis extending transversely with respect to the axis of the body 12. Consequently, the shaft axes 30 and 32 are spaced apart and generally parallel with respect to each other. In addition, like the rear legs 16 and 18, the front legs 22 and 24, while fixed to the shaft 32, are preferably angularly spaced from each other.

With reference now to FIGS. 1 and 3, a wheel 36 is rotatably mounted about an axle 38 and protrudes downwardly from the lower end of each leg 16, 18, 22 and 24 so that the wheels 36 support the hobby horse 10 on a ground support surface 40. The axes of the wheel axles 38 are substantially parallel to the pivotal axis of the shaft 30 or 32.

Each wheel 36 includes a one-way clutch assembly 42 which allows the wheel 36 to rotate in only one rotational direction or clockwise as viewed in FIG. 1. Although the one-way clutch can be of any conventional construction, it preferably comprises a ratchet mechanism having a ratchet or serrated surface 44 on the wheel 36 and a spring loaded ratchet lever 48 pivotally mounted to the leg 16, 18, 22 or 24 and which cooperates with the surface 44. The operation of such ratchet mechanisms is well known so that a further description thereof is unnecessary.

With reference now to FIGS. 1 and 2, a pair of wheels 50 and 52 are rotatably mounted with the body 12 of the hobby horse 10 so that the wheels 50 and 52 are coaxial and spaced apart from each other. In addition, the axis of rotation of the wheels 50 and 52 is parallel to the axes of the shafts 30 and 32 and the wheels 50 and 52 are positioned approximately midway in between the shafts 30 and 32.

An electric motor 54 secured to the body 12 rotatably drives the wheels 50 and 52 in unison with each other through a conventional gearbox assembly 56 (FIG. 1). An electric battery 58 is electrically connected to the motor 54 in order to power the motor 54 and thus rotatably drive the wheels 50 and 52.

A first elongated arm 60 has one end 62 pivotally connected by a pivot pin 64 to the rear leg 16 and 18 at a position radially spaced from the axis of the shaft 30. The other end 66 of the arm 60 is connected by a pivot pin 68 to the wheel 50 at a position radially spaced from the axis of rotation of the wheel 50. Similarly, a second arm 70 has one end 72 pivotally connected by a pivot pin 74 to the front legs 22 and 24 at a position radially spaced from the axis of the shaft 32. The other end 76 of the arm 70 is pivotally connected to a pivot pin 78 on the other wheel 52 at a position radially spaced from the axis of the wheel 52.

Upon activation of the motor 54, the motor 54 rotatably drives the wheels 50 and 52 in unison with each other. This in turn longitudinally reciprocally drives the arms 60 and 70 which, due to their pivotal connection with the legs 16, 18, 22 and 24 of the hobby horse 10, reciprocally pivotally drives the rear legs 16 and 18 about their axle 30 and the front legs 22 and 24 about their axle 32. The pivot pins 68 and 78 are circumferentially spaced from each other on their respective wheels 50 and 52 so that the front and rear legs pivot in synchronism with each other but in opposite rotational directions. Thus, the front and rear legs pivot towards and away from each other.

Since only the wheels 36 engage the ground and since each wheel 36 includes a one way clutch 42, the wheels roll or rotate along the ground support surface 40 only when their associated legs move in the forward direction. Conversely, as the legs 16, 18, 22 or 24 are moved rearwardly due to their pivotal movement about their axles 30 or 32, respectively, the wheels 36 lock against rotation. Thus, when the front legs 22 and 24 pivot towards the rear legs 16 and 18, the wheels 36 on the rear legs 16 and 18 roll while the wheels 36 on the front legs 22 and 24 are locked against rotation and vice versa. The pivotal movement of the legs 16, 18, 22 and 24 thus moves the body 12 of the hobby horse 10 forwardly in the desired fashion.

With reference now to FIG. 4, a modification of the present invention is thereshown in which the wheels 50 and 52 are replaced by a crankshaft 80 which is rotatably mounted within the interior of the body 12 so that the crank shaft 80 is rotatable about an axis parallel to the axis of the shafts 30 and 32 and so that the crankshaft 80 is positioned midway in between the shafts 30 and 32. The crankshaft 80 includes two crank pins 82 and 84 which are parallel to the axis of the crankshaft 80 but offset or radially spaced from the crankshaft axis. The arm 60 is rotatably connected to one crank pin 84 while the other arm 70 is rotatably connected to the other crank pin 82. The motor 54 is mechanically coupled to the crankshaft 80 so that, upon activation of the motor 54, the motor 54 rotatably drives the crankshaft 80. This in turn reciprocally longitudinally drives the arms 60 and 70 in the desired fashion and pivots the legs 16, 18, 22 and 24.

FIG. 4 illustrates a still further modification to the present invention in which the hobby horse body 12 includes a rear section 90 and a front section 92. The shaft 30 is rotatably mounted to the rear section 90 of the body 12 while the shaft 32 is pivotally mounted to the front section 92 of the body 12.

The front end of the rear section 90 includes a generally semi-spherical socket 94 which receives a semi-spherical ball 96 on the rear end of the front section 92. This ball 96 and socket 94 connection between the front and rear sections 90 of the body 12, respectively, allow limited pivotal movement of the front section 92 about a vertical axis with respect to the rear section 90. This limited movement, in turn, permits the hobby horse to be steered by the rider. In addition, in this embodiment of the invention, the pivot pin connection between the arm 70 and the front legs 22 and 24 as shown in FIG. 1 is replaced by a joint 98 having a pivot pin 100 to accommodate the limited pivotal movement between the body sections 90 and 92 without binding the arm 70.

From the foregoing, it can be seen that the hobby horse of the present invention provides a simple, unique and yet effective self propelled hobby horse for a child.

Having described my invention, however, many modifications thereto will become apparent to those skilled in the art to which it pertains without deviation from the spirit of the invention as defined by the scope of the appended claims.

I claim:

1. A hobby horse comprising:
   an elongated body having an upper surface adapted to support a rider,
   at least one front leg and at least one rear leg,
   means for pivotally mounting an upper end of each leg to said body about a substantially horizontal axis extending transversely with respect to a longitudinal axis of said body so that the axes of said legs are spaced apart and parallel to each other and so that said legs depend downwardly from said body, said pivotal mounting means comprising two cylindrical shafts, each shaft having both ends received in cylindrical recesses integrally molded in the body,
   at least two wheels, one wheel being secured to a lower end of each leg, said wheels adapted to engage a ground support surface,
   means for preventing rotation of said wheels in one rotational direction while permitting rotation in the opposite rotational direction,
   means for reciprocally pivoting said legs about an axis, said means comprising an electric motor contained within said body, means for electrically powering said motor contained within said body, and means for mechanically connecting said motor to said legs, and,
   wherein said body comprises a front section and a rear section, said rear leg being connected to said rear section and said front leg being secured to said front section, means for pivotally attaching said front section to said rear section about a vertical axis, said pivotal attaching means comprising a semi-spherical socket integrally formed with said rear section and a semi-spherical ball integrally formed with said front section, said ball being rotatably received in said socket.

2. The invention as defined in claim 1 wherein said rotation preventing means comprises a one-way clutch.

3. The invention as defined in claim 2 wherein said one-way clutch comprises a one-way ratchet clutch.

4. The invention as defined in claim 1 wherein said mechanical connecting means comprises a crankshaft.

5. The invention as defined in claim 1 wherein said at least one front and rear leg each comprises a pair of legs, said first legs each having a longitudinal axis which intersect each other at an acute angle, and said rear legs each having a longitudinal axis which intersect each other at an acute angle.

6. The invention as defined in claim 5 wherein said angle is between 20 and 30 degrees.

* * * * *